United States Patent [19]

Siciliano

[11] 4,419,962
[45] Dec. 13, 1983

[54] DOOR CONSTRUCTION FOR POULTRY CAGE

[75] Inventor: Anthony J. Siciliano, South Lyon, Mich.

[73] Assignee: Diamond Automations, Inc., Farmington, Mich.

[21] Appl. No.: 362,602

[22] Filed: Mar. 29, 1982

[51] Int. Cl.³ .............................................. A01K 31/10
[52] U.S. Cl. ..................................................... 119/17
[58] Field of Search ............................ 119/17, 18, 19; 220/324, 326, 7, 19

[56] References Cited

U.S. PATENT DOCUMENTS

| | | | |
|---|---|---|---|
| 1,572,050 | 2/1926 | Stewart | 119/17 |
| 1,580,775 | 4/1926 | Barker | 119/17 |
| 2,698,004 | 12/1954 | Luther | 119/18 X |
| 3,274,972 | 9/1966 | Keen et al. | 119/48 |
| 3,545,406 | 12/1970 | Osborn | 119/17 |
| 4,222,348 | 9/1980 | Nield | 119/17 |

Primary Examiner—Hugh R. Chamblee
Attorney, Agent, or Firm—Kenyon & Kenyon

[57] ABSTRACT

A cage door construction, useful for poultry cages and the like which are stacked one above another, has a door opening framed in a wall of the cage by vertical and horizontal wires. The vertical wires extend beyond the upper horizontal wire of the door frame and are bent over to become part of the top of the cage where they serve as guide wires for sliding movement of the cage door. The case door is formed of a single piece of wire bent into a U-shaped with lateral arms extending outward from the open end therof. Each laterally extending arm is provided at its end with an eye which slidably engages one of the guide wires. Indentations, formed in the legs of the U-shaped door, can lock into place under the upper horizontal wire. When closed, a portion of the U-shaped door slides in front of and is then bent under a wire disposed below the door frame; it thus travels downward, being engaged in an entrapment below the door to restrict its sideward movement.

11 Claims, 5 Drawing Figures

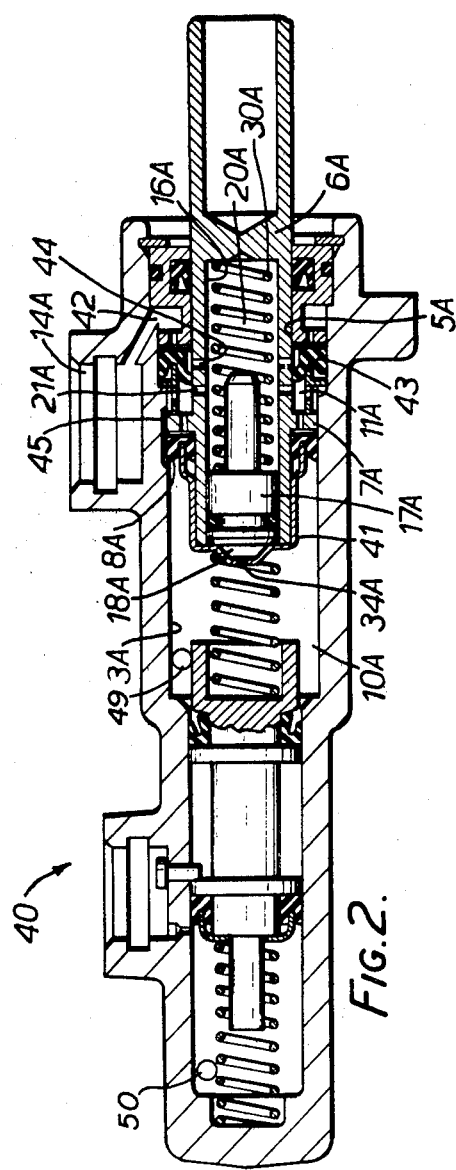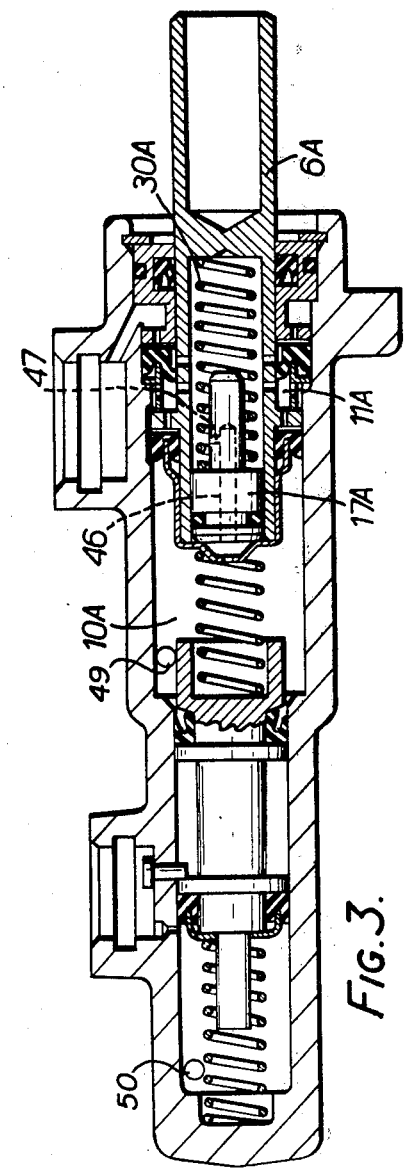

DOOR CONSTRUCTION FOR POULTRY CAGE

The present invention relates to cages for use in the poultry industry. More particularly, the invention relates to an improved door for use with an individual poultry cage which is situated beneath another cage in a battery of such cages.

In raising poultry, it is conventional to place the birds in individual cages which are stacked, one above the other, in tiers. As described in U.S. Pat. No. 3,274,972 to E.M. Keen et al., for example, egg laying batteries may have a plurality of cage units, each of which has a wire mesh floor for supporting a hen, and the cages are assembled in a plurality of tiers. The tiers are offset from one another in a stepped relationship so that clearance is provided behind the lower cages for droppings from the upper cages. Each individual cage has a wire door at its front which slides vertically to permit direct access to the space within the cage. Since the upper cages are behind the lower cages, it is a simple matter for the operator's hand to grasp the upward projecting handle of the door and to lift the door upwards. However, when cages are arranged in tiers directly above one another, this door arrangement is impracticable, since, at least as to those cages in the lower tiers, a lower cage door cannot be moved upwards without being blocked by running into the overlying cage.

It is an object of the present invention to provide a door structure for use with cages which are stacked directly above each other and which is easy to operate and maintain.

SUMMARY OF THE INVENTION

The above object is met by the present invention in a cage door construction in which the front and top wall sections of an individual cage are formed, at least in part, of wires. A doorway opening is placed in the front wall of the cage, being framed by upper and lower transverse door wires and by left and right lateral door wires. Vertical guide wires each extend a short distance above the upper transverse door wire and are then bent over to become part of the top of the cage. These wires serve as guides for vertical and rearwards movement of the door and therefore extend into the roof for a distance which is uninterrupted by junctions with other roof members. In a preferred embodiment, the guide wires are extensions of the right and left door wires.

An entrapment is formed beneath the doorway and lying between the lower transverse door wire and a lowermost horizontal wire which is spaced below the lower transverse door wire. The entrapment receives the closed end of the cage door and has vertical side wires which prevent appreciable sideways movement of the door.

The cage door proper is made of a single piece of wire which takes the form of a vertically elongated, inverted U. The U-shaped door has vertical legs which extend over and lie on the upper and the lower transverse door wires. The closed end of the door fits into the entrapment. Each laterally outward projecting right and left arm has an end loop or eye which is slidably engaged on one of the guide wires and each serves as a hinge and a retainer for the door. A step is formed in each leg of the U-shaped door, disposed adjacent to the lateral arms, and snaps into place beneath the upper transverse door wire to provide a lock for the door.

When seated in the doorway, the lower part of the door is held in place in the entrapment; e.g. the closed end of the U-shaped door passes in front of the lower transverse door wire and behind the lowermost horizontal wire.

To assist in the seating of the closed end of the door in the entrapment, the wire door legs are bent where they pass over the lower door wire to displace the closed end of the door into a plane which lies parallel to the main part of the door.

BRIEF DESCRIPTION OF THE DRAWINGS

FIGS. 2, 3 and 4 are side views, in partial cross-section, of a door of FIG. 1 being moved upwards out of the closed position; and FIG. 5 is a side view of a door of FIGS. 1–4 in a fully open position.

DETAILED DESCRIPTION OF THE INVENTION

Figure 1:
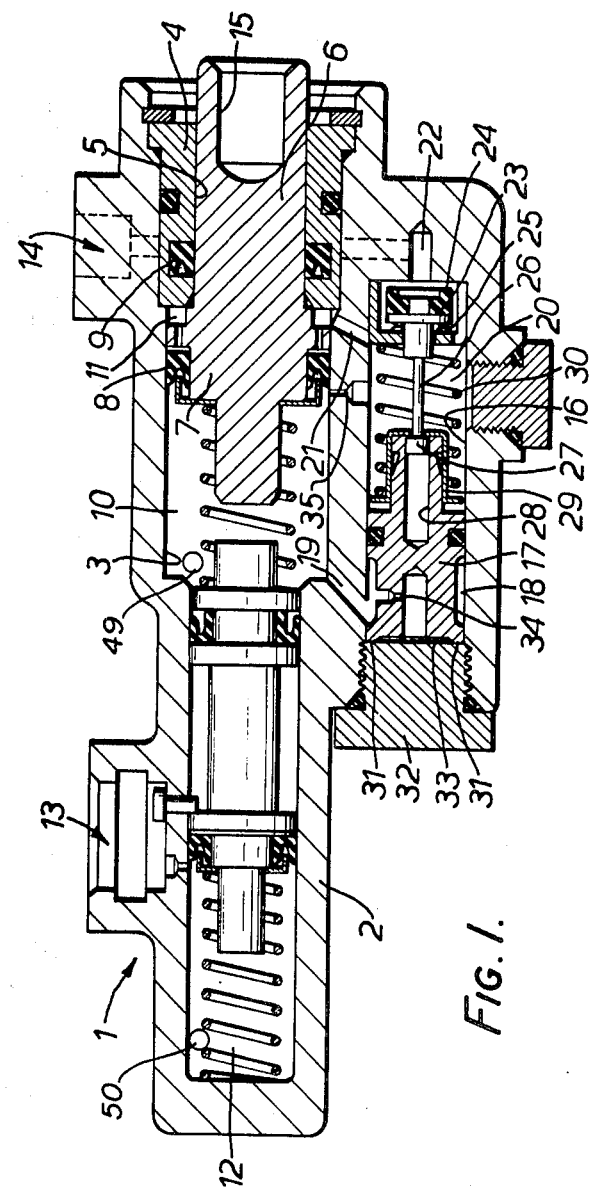
FIG. 1 is a perspective view of two tiers of poultry cages having doors constructed in accordance with the teachings of the invention.

FIG. 1 shows two tiers of poultry cages 2 which are stacked one directly above the other. Cages 2 are arranged side by side, being separated by vertical walls. Each cage also has a floor 6, a rear wall (not shown), and a top 4 of which at least the front part includes wires. The front of each individual cage 2 is provided with a doorway 8 which can be closed by a door 10. As shown in FIG. 1, the doors on the lower tier are in the closed position; the right hand door in the upper tier is partially open and the left hand door in the upper tier is fully raised and pushed back out of the way in cage top 4. The front wall of each cage is formed of vertical and horizontal wires which are conventionally fastened to each other. Each doorway 8 is framed on either side by vertical wires 16 and 17 which, in the illustrated embodiment, extend a short distance into the cage top as guide wires 16' and 17', being bent to the rear at knees 19. The top and the bottom of doorway 8 are formed by upper and lower transverse door wires 12 and 14, respectively, which run through the fronts of all of the cages. A horizontal wire 18 lies below and parallel to transverse door wire 14. Horizontal wires 14 and 18 are interconnected underneath doorway 8, by two short vertical wires 26 and 28, to form entrapment 30. The height of entrapment 30 is less than the vertical length of guide wires 16' and 17' between upper transverse wire 12 and knees 19.

Additional vertical wires 21 form remaining parts of the front and top of the cage; as shown, each of them continues to the rear, forming part of top 4 after being bent at knees 23. Wires 22 and 24 also serve as part of top 4, but start in the cage front at upper transverse door wire 12, being bent over from the front wall into the cage top at knees 25.

In the illustrated embodiment of the invention, door 10 is formed of a single piece of wire which is bent into a U-shape having legs 32 and 33. A pair of left and right arms 34 and 35 project laterally outwards from the free end of each leg 32 and 33, and a closed end 38 which connects legs 32 and 33 at the bottom of the door. The ends of arms 34 and 35 have end loops or eyes 36 and 37 which are slidably engaged on the guides formed by the upward and rearward extensions 16' and 17' of left and right lateral door wires 16 and 17, respectively.

As can be seen more clearly in the side view of FIG. 5, closed end 38 of door 10 lies in a plane which is slightly displaced to the rear of, but parallel to, the plane of door 10. When door 10 is being closed and closed end 38 is being inserted into entrapment 30, the force required to put closed end 38 into entrapment 30 is, therefore, small. Vertical entrapment wires 26 and 28 are located so as to prevent substantial lateral displacement of lower closed end 38 when it is latched. End loops 36 and 37 are made by passing each end of the door wire behind and around to the front of the respective guide wire 16' and 17'. In addition to serving as slides for the movement of door 10 on the guide wires, the loops and their supporting arms serve as torsion members when the door is closed and the arms are brought to bear on the vertical surfaces of upper wires 22 and 24. Each leg of door 10 is also provided, near the open end of the U, with a step or detent having a surface 40 (see FIG. 3 for example). Each step 40 can be formed (as seen in FIGS. 2-5) by first bending each leg sharply forward out of the plane of the door and somewhat downward at knee 42. After the short step or detent surface 40 is thus provided, the leg wire is again bent upwards at knee 44, continuing a short distance to the point at which it is bent to form the respective laterally projecting arm 34 or 35. Detent step or surface 40 can also be formed, as seen in FIG. 1, by bending each leg wire out of the plane of the door to the rear, followed by a sharp forward reversal, as described above. In either case, the downward slope of each surface 40 provides a catch for locking each door leg and preventing unintended upward motion of the door.

The manner of opening a cage door is shown in FIGS. 2-5. In FIG. 2 the door is locked closed, steps 40 being hooked under upper transverse door wire 12 and closed end 38 being entrapped behind lowermost horizontal wire 18 and in front of lower transverse door wire 14.

Release of the door is shown in FIGS. 3 and 4, where the effect of grasping the middle of door 10 and pulling it outwards and upwards in the direction of the arrows is shown. When sufficient outward force has been exerted, steps 40 are disengaged from beneath upper transverse door wire 12 and the further application of upward force begins to lift the door (see FIG. 4). Continued application of the upward force frees closed end 38 from entrapment 30, freeing the door to be swung outwards. Meanwhile, end loops 36 and 37 have been traveling upwards on guide wires 16' and 17'. When the loops reach knees 19, they are moved to the rear, causing the door to nest into the space between upper wires 22 and 24. The horizontal length of guide wires 16a and in 16b is made free of interruption for a substantial distance to the rear to allow the length of the door to be received.

When a door is to be closed, it is first moved forward from the open position of FIG. 5 sufficiently so that the door can be swung downward. When terminal loops 36 and 37 reach guide wire knees 19, closed end 38 of the door, which is by then in contact with lower lateral door wire 14, can be pressed into position behind horizontal wire 18. With application of downward pressure door 10 can then be seated in entrapment 30 and steps 40 torsionally snapped into place to engage under upper transverse door wire 12. The seating of steps 40 is insured by torsion developed in the door and in lateral arms 34 and 35 as a result of the outward flexing of the door as it passes down over upper transverse door wire 12. When steps 40 engage wire 12, they are snapped into a locking position. The upward curve of each step 40 is held firm against upper transverse door wire 12 by the slight residual torsion remaining in door arms 34 and 35 as they are bent forward by contact with upper wires 22 and 24.

While the door construction of the invention has been illustrated by means of an embodiment in which metal wires are the structural elements, it will be understood by those skilled in the art that the principles of the invention can be applied to the construction of cage doors using other materials. The below appended claims should, therefore, be interpreted in keeping with the spirit of the invention rather than limited to the specifics of the particular embodiment described above.

What is claimed is:

1. A cage door construction comprising:
    a cage front and a cage top, the cage front including left and right lateral wires and upper and lower transverse wires which intersect the upper and lower lateral wires to form a doorway;
    a pair of guide wires extending upwards from the upper transverse wire and bent over to form part of the cage top; and
    a flexible door for closing the doorway, the door including an elongated main part arranged in a first plane, a lower part bent out of the first plane to lie in a second plane which is substantially parallel to the first plane, and an upper part from which right and left arms extend laterally outwards, the elongated main part extending from the lower transverse wire to the upper transverse wire, the left and right arms each slidably engaged on the respective guide wire.

2. A cage door construction in accordance with claim 1 and further comprising:
    a step on the elongated main part positioned near the upper part of the flexible door to snap under the upper transverse wire when the flexible door is closed.

3. A cage door construction in accordance with claim 1 further comprising:
    at least one additional vertical wire extending upward from the upper transverse wire between the guide wires, each such additional vertical wire contacted by the flexible door when the flexible door is closed.

4. A cage door construction in accordance with claim 1 in which the elongated main and lower parts of the flexible door are formed of a single, U-shaped wire.

5. A cage door construction in accordance with claim 1 and further comprising:
    an entrapment arranged beneath the doorway in the front wall, the lower part of the flexible door extending into the entrapment when the flexible door is closed.

6. A cage door construction in accordance with claim 5 in which the lower part of the flexible door extends a predetermined distance into the entrapment and the left lateral wire and the right lateral wire extend upwards from the upper transverse wire before being bent over for a distance which is equal to or greater than the predetermined distance.

7. A cage door construction in accordance with claim 1 and further comprising:
    a second lower transverse wire spaced below the lower transverse wire, both lower transverse wires comprising an entrapment for the lower part of the flexible door when the flexible door is closed.

8. A cage door construction in accordance with claim 7 and further comprising:
 a pair of vertical wires fastened between the lower and the second lower transverse wires to limit sideways motion of the lower part of the flexible door.

9. A poultry cage system having cage layers disposed directly on top of one another with the forward faces of each cage being in line with the faces of the other cages, each cage having front, top, back and bottom sections,
 a doorway in the front section framed by left and right lateral door wires and by an upper transverse door wire and a lower transverse door wire, the lateral door wires extending a first distance above the upper transverse door wire as top wires, the top wires bent at an elbow and extending uninterrupted for a second distance into the top;
 an entrapment in the wall beneath the doorway, the entrapment comprising a second transverse wire spaced beneath the lower door wire and a pair of laterally spaced vertical entrapment wires located between the lower door wire and the transverse entrapment wire; and
 an inverted U-shaped wire door comprising a closed end, a pair of legs extending parallel to one another from said closed end and having upper free ends, and an arm extending laterally outwardly from the free end of each of the legs to an eye, each eye slidably engaged with one of the top wires, the closed end of the door passing in front of the lower door wire, behind the transverse entrapment wire, and between the vertical entrapment wires.

10. A poultry cage system in accordance with claim 9 and further comprising:
 an upward facing step on each leg of the door, each step located beneath the upper free end of the respective leg to engage the upper door wire when the door is closed.

11. A poultry cage system in accordance with claim 9 and further comprising:
 an additional pair of top wires extending upward from the upper transverse door wire and between the lateral door wires, each additional top wire positioned to contact and flex one of the lateral arms when the door is closed.

* * * * *